US006861586B2

(12) United States Patent
Cigelske, Jr.

(10) Patent No.: US 6,861,586 B2
(45) Date of Patent: Mar. 1, 2005

(54) ELECTRICAL SHIELD FOR A WELDING APPARATUS

(75) Inventor: James J. Cigelske, Jr., Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/065,774

(22) Filed: Nov. 18, 2002

(65) Prior Publication Data

US 2004/0095704 A1 May 20, 2004

(51) Int. Cl.[7] .................................................. H01J 15/00
(52) U.S. Cl. ................................. 174/50.56; 174/50.59
(58) Field of Search ............................ 174/50.56, 50.59

(56) References Cited

U.S. PATENT DOCUMENTS

| | | |
|---|---|---|
| 3,636,637 A | 1/1972 | Keith |
| 3,749,967 A | 7/1973 | Douglas-Hamilton et al. |
| 5,129,843 A | 7/1992 | Bowsky et al. |
| 5,742,000 A | 4/1998 | Stevens |
| 6,075,226 A * | 6/2000 | Kishbaugh .................. 219/133 |
| 6,193,548 B1 | 2/2001 | Sigl et al. |
| 6,225,596 B1 * | 5/2001 | Chandler et al. ........ 219/130.1 |

FOREIGN PATENT DOCUMENTS

GB 450800 11/1935

* cited by examiner

Primary Examiner—Hung V. Ngo
(74) Attorney, Agent, or Firm—Ziolkowski Patent Solutions Group, LLC

(57) ABSTRACT

A welding apparatus having a metal enclosure and a plastic end panels affixed to the enclosure to contain therein the various electrical components of the welding apparatus. There is an internal negative electrical stud within the metal enclosure that has a high voltage applied to the stud. A protective, non-conductive electrical shield is located between the electrical stud and other conductive components within the welding apparatus to prevent arcing between the electrical stud and those conductive components as well as to prevent arcing between the electrical stud and the metal enclosure itself.

17 Claims, 4 Drawing Sheets

ELECTRICAL SHIELD FOR A WELDING APPARATUS

BACKGROUND OF INVENTION

The present invention relates generally to a welding apparatus and, more particularly, a portable welder having an electrical shield to prevent electrical arcing within the apparatus.

Portable welding units transportable to a work site are known. Typical of such known units include a lightweight enclosure consisting of a sheet metal material, such as aluminum or other metal and which metal enclosure has a front panel and a rear panel at the ends of the enclosure to contain the various components of the welder therein and also Includes a base that underlies the enclosure. In particular, such portable welding units or apparatus are, by nature, small, compact units that can be readily carried by and individual and may easily weigh less than 15 pounds. In the construction of such portable welders, therefore, it is necessary to install a large number of components, including the various electrical components, In a relatively small space in order to provide a fully functional welder having the features desired by the user while still constructing the unit to be compact and lightweight.

Accordingly, with such portable welding units, there are a considerable number of electrically conductive components that must be located in close proximity to each other. With welding apparatus, there are certain safety requirements that dictate the minimum spacing between electrical components in the apparatus to prevent arcing between conductive elements within the apparatus. Thus, with the portable welding apparatus, the problem is compounded by the need to keep the spacing to a minimum in order to assemble all of the necessary electrical and mechanical components within the required small volume of space within the outer enclosure.

As a further aggravation of the problem, there is a system that is utilized on a regular basis with large welding apparatus, in the TIG mode of operation, that is known as arc-starting and which provides a pulsed high voltage to a negative tungsten welding electrode for a predetermined period of time at the initiation of the welding process to better enable the striking of an arc between the welding electrode and the workpiece that is connected to a positive electrical source. While the presence of a high voltage is not particularly a problem in the large welding apparatus where the space is not at a premium, it is a considerable problem with the aforedescribed portable welding units since that high voltage can acerbate the problem of arcing within the portable welding apparatus simply due to the close proximity of the high voltage sources to other conductive surfaces.

In particular, with the arc starting feature, the voltage at the welding electrode and which is connected into a negative electrical receptacle externally provided in the welding apparatus, can reach 12,000 volts and therefore the internal stud that is located internal of the welding apparatus and which is connected to the exterior electrical receptacle also experiences that high voltage. Thus, in the interior of the welding apparatus, there is a potential high voltage site, that is, at the negative stud within that welding apparatus and, due to the extremely close quarters of the portable welding apparatus, the presence of the high voltage source can cause an arcing problem to occur within the apparatus itself. One of the more susceptible paths for that arcing is from the internal negative stud to the metal enclosure itself that surrounds the components of the welding apparatus; however, the problem obviously exists with respect to other electrically conductive components within the apparatus.

Therefore, it would be desirable to provide a portable welding apparatus that has the feature of arc starting available to the user but which also has protection in the form of shielding internal of the welding apparatus to prevent electrical arcing within the welding apparatus itself, thereby providing the advantage of portability along with the availability of the arc starting feature.

BRIEF DESCRIPTION OF INVENTION

The present invention is directed to an improved electrical shielding means to protect against electrical arcing within a portable welding apparatus.

In the preferred embodiment, and as will be specifically described herein, the welding apparatus Itself is a portable apparatus comprised of a metal enclosure that houses the various components that are utilized in providing a variable power supply to carry out the welding process. The enclosure has a pair of end panels, that is, there is a front panel and a rear panel which are affixed to the enclosure to contain those components therein. The front and rear plastic panels are preferable constructed of a molded plastic material.

In the front panel, there is provided a pair of electrical terminals. One of the terminals is a positive pole of an electric supply and the other electrical terminal is a negative pole of an electrical supply. Each of the electrical terminals comprises a female receptacle located on the external surface of the front panel and an electrical connector on the internal surface of the front panel. In the case of the negative electrical terminal, the internal connection is made by means of an electrical stud and which is connected to a bus bar internal of the apparatus to supply the electrical energy to that negative terminal. The female receptacles are adapted to be connected to cables that supply power to the welding electrode and to the workpiece. In the case of TIG welding, the negative terminal is connected to a tungsten welding electrode and the positive terminal is connected to the workpiece.

With the afore-described feature of arc starting, therefore, a high voltage is applied to the electrical stud of the negative terminal and, since that electrical stud is located within the internal space contained within the enclosure and end panel, some electrical shielding is necessary to protect the high voltage at the negative electrical stud from arcing to other electrically conductive components or conductive materials of the welding apparatus.

Accordingly, in accordance with the present invention, an electrical shield is provided that at least partially surrounds the negative electrical stud and which prevents arcs from being established from the high voltage at the negative electrical stud to the metal enclosure itself as well as to other electrically conductive components within the portable electrical apparatus. With the present invention, there is an electrical shield, preferably formed of a non-conductive plastic material, and more preferably a plastic material commonly sold under the trademark MYLAR.

The shield is formed of a plurality of planar sides that are pre-formed into the desired configuration and that configuration is a generally inverted U-shape that can be fitted into a plurality of ribs that can be molded into the end panel and which project outwardly from the inside surface of the end panel. Thus, in the assembly of the portable welding apparatus, the shield is readily added to the apparatus as one of the last steps in the assembly process easily and with time consuming steps.

The shield itself is preferably a one piece shield, preconfigured construction, having a large external side that is located between the electrical stud and the metal enclosure to protect against arcs between the electrical stud and that enclosure. There is also an upper planar side that extends over the top of the electrical stud, an internal planar side that is located inwardly of the electrical stud to complete the inverted U-shaped shield and there is a further lower planar side that extends inwardly from the lower edge of the internal planar side that extends inwardly toward the internal space of the enclosure. Thus the overall shield surrounds the electrical stud on at least three sides and protects the electrical stud from arcing to the metal enclosure as well as other electrical and conductive components within the portable welding apparatus.

Various other features, objects and advantages of the present invention will be made apparent from the following detailed description and the drawings.

BRIEF DESCRIPTION OF DRAWINGS

The drawings illustrate one preferred embodiment presently contemplated for carrying out the Invention.

In the drawings.

DETAILED DESCRIPTION

Figure 1:
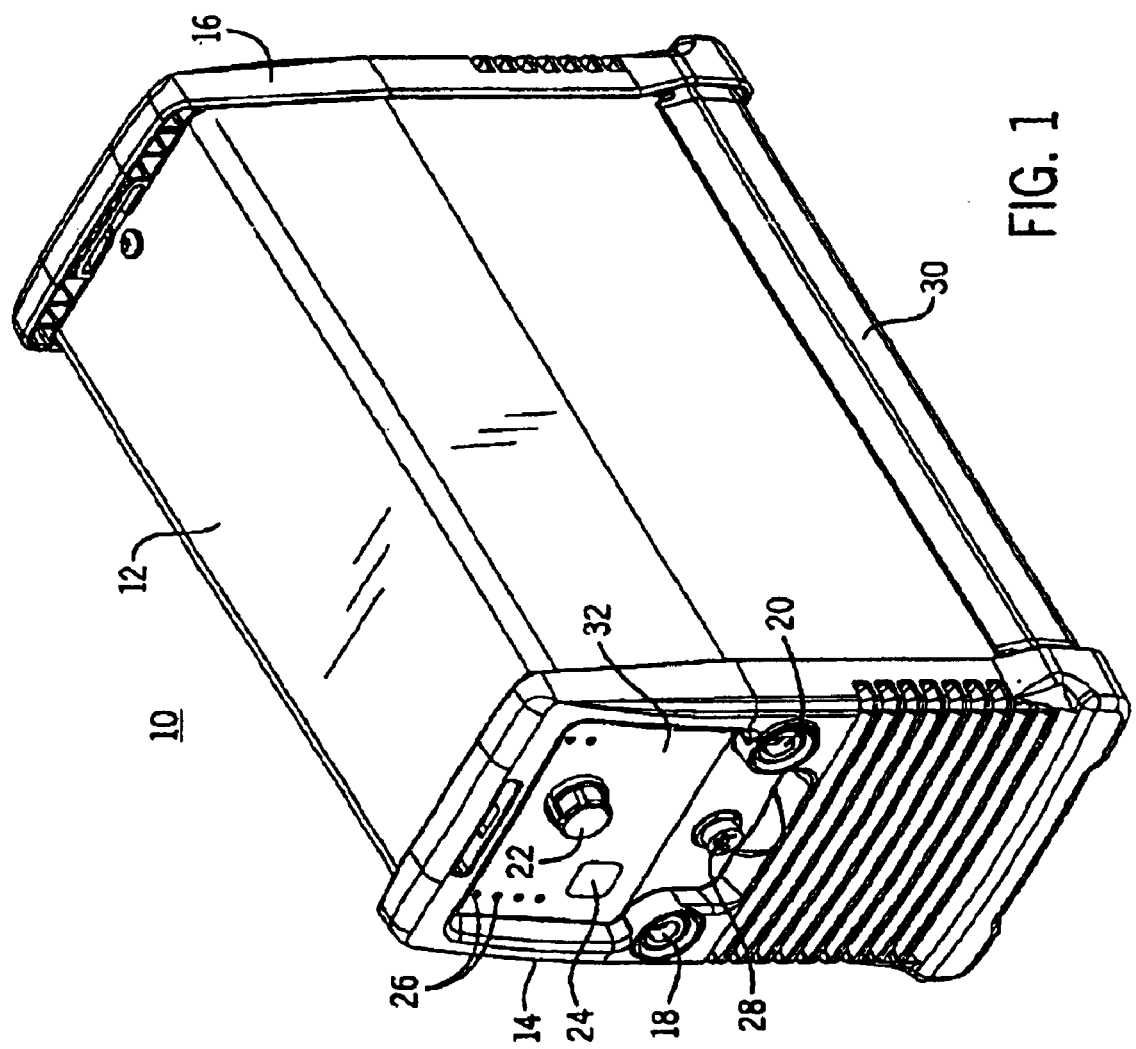
FIG. 1 is a perspective view of a welding apparatus for which the present invention is applicable.

Referring now to FIG. 1, there is shown a welding apparatus 10 that utilizes the present invention. As can be seen, the welding apparatus 10 comprises an enclosure 12 that is a sheet metal construction, preferable of aluminum, and having a front panel 14 and a rear panel 16. Both the front and rear panels 14, 16 are preferably constructed of a molded plastic material. The front panel 14 has a central control section and which includes the various controls for the welding functions and can include female receptacles 18, 20 that are used to connect the welding cables. In the embodiment shown, female receptacle 18 is the positive source of electrical energy and the female receptacle 20 provides a negative source of the electrical energy.

A control knob 22 is provided in order to control the current to the welding electrodes and a selector button 24 is provided to enable the welding apparatus 10 to be switched between TIG and stick operation. There may also be a series of LEDs 26 to provide an indication of status of the welding apparatus and to provide information as to its operation. A remote connector plug 28 is also used for the operation of a remote control such as a foot operated switch for the welding apparatus 10.

A base 30 is located underneath the enclosure 12 and can also be a molded plastic construction and, as can be seen, the base 30 can be actually elevated with respect to the floor such that the welding apparatus 10 contacts the floor through the front and rear panels 14, 16. As can be seen, FIG. 1 shows the external surface 32 of the front panel 14, that is, the surface that faces outwardly of the internal space that is enclosed by the enclosure 12 and the front and rear panels 14, 16 to contain the various components used in the functioning of the welding apparatus 10.

Figure 2:
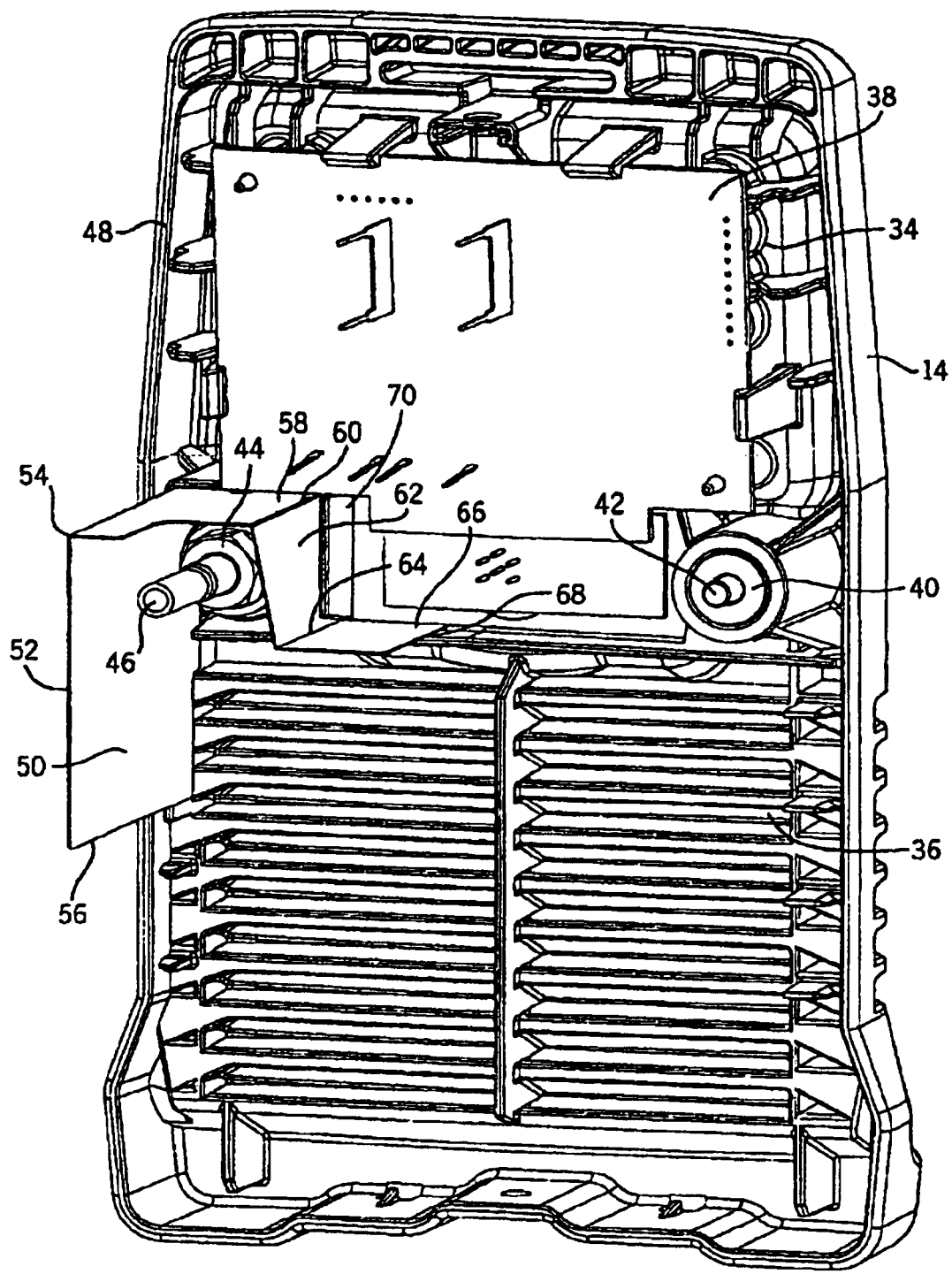
FIG. 2 is a perspective view of the inside of the front panel of the welding apparatus of FIG. 1 showing the electrical shield of the present invention.

Turning now to FIG. 2, taken along with FIG. 1, there is shown a perspective view of the front panel 14 and illustrating the internal surface 34 thereof. As shown, the front panel 14 includes a plurality of louvers 36 that allow the ambient air to circulate, by means of a fan (not shown) through the welding apparatus 10 in order to cool the various components contained in the internal space within the enclosure 12. A similar set of louvers is formed in the rear panel 14.

There is also a circuitboard 38 for carrying out certain of the electrical functions of the overall welding apparatus 10 and, in the preferred embodiment, that circuitboard 38 is located in the upper area of the front panel 14 and affixed to the internal surface 34 thereof. The circuitboard 38 obviously includes a number of electrical components that are utilized and other conductive components. A positive electrical terminal 40 is provided to conduct the electric current through the front panel from a connector 42 at the internal surface 34 of the front panel 14 to the female receptacle 18 located at the external surface 32 of the front panel 14.

Likewise, there is a negative electrical terminal 44 that conducts the electric current through the front panel 14 from an electrical stud 46 located at the internal surface 34 of the front panel 14 to the female receptacle 20 located at the external surface 32 of the front panel 14. The electrical stud is 46 is normally connected to a bus bar (not shown) that supplies the electrical current to the electrical stud 46 and therefore to the female receptacle 20 for use with the tungsten welding electrode in the TIG mode of operation of the welding apparatus 10. As used herein, the term electrical stud 46 is intended to mean any electrical connector, electrical contact or mounting hardware used in connection therewith.

As has been explained, the arc starting system that is conventionally used on large welding apparatus can be used with the present portable welding apparatus 10 and therefore there will periodically be a high voltage in the range of about 12,000 volts at 60 hertz, present at the electrical stud 46 as well as with the various mounting hardware or other components touching or abutting against and thus in conductive relationship with the electrical stud 46. Due to the close proximity of the electrical stud 46 to the circuitboard 38, there is a danger of that such high voltage can cause arcing between the electrical stud 46 and one or more of the conductive electrical components on the circuitboard 38 and, in addition, there is a similar danger that the arcing can occur between the electrical stud 46 and the metal enclosure 12 that interfits with the outer peripheral edge 48 of the front panel 14 and therefore the metal enclosure 12 is in very close proximity to the electrical stud 46.

In order to prevent the afore-described arcing problem, there is an electrical shield 50 that is affixed to the internal surface 34 of front panel 14 and which at least partially surrounds the electrical stud 46. As can be seen, the electrical shield 50 is preferable pre-configured into a desired shape and, in the preferred embodiment, that shape is an inverted U-shape. The electrical shield 50 is constructed of a non-conductive material, preferably a plastic material and, more preferable, a plastic material available under the trademark MYLAR and preferably has a thickness of about 10 to 15 thousandths of an inch.

The inverted U-shape configuration is comprised of an external planar side 52 having an upper external edge 54 and a lower edge 56. As can be seen, the lower edge 56 extends a considerable distance below the electrical stud 46 in order to prevent the possible arc from passing around the lower edge 56 of the external planar side 52 from the electrical stud 46 to reach the metal enclosure 12.

An upper planar side 58 extends inwardly toward the internal space of the enclosure 12 to an upper internal edge 60 and the upper planar side 58 is preferably approximately in a plane a right angle to the plane of the external planar side 52 and extends inwardly to the upper internal edge 60. Extending downwardly from the upper internal edge 60 is an internal planar side 62 and which is preferably in a plane approximately at a right angle to the plane of the upper planar side 58 and the Internal planar side 52 extends downwardly to a lower internal edge 64 that is located below the electrical stud 46. Thus, the external planar side 52, the upper planar side 58 and the internal planar side 62 form the inverted generally U-shape of the electrical shield.

As a further protection against the possibility of an arc passing around the internal lower edge 64 of the internal planar side 62, there is a further inward planar side 66 that extends further inwardly toward the internal space within the enclosure 12 to an internal edge 68. The internal edge 68 is located a predetermined distance inwardly from the electrical stud 44 to prevent an arc from progressing around the lower internal edge 64 to reach any of the conductive components of the circuitboard 38.

There can also be seen in FIG. 2, a rib 70 that extends outwardly from the internal surface 34 of the front panel 14 and preferably the rib 70 is molded into the front panel 14 during the molding of the front panel 14 itself. The electrical shield 50 fits snugly against the rib 70 and the rib 70 helps to hold the electrical shield 50 in its position affixed to the internal surface 34.

Figure 3:
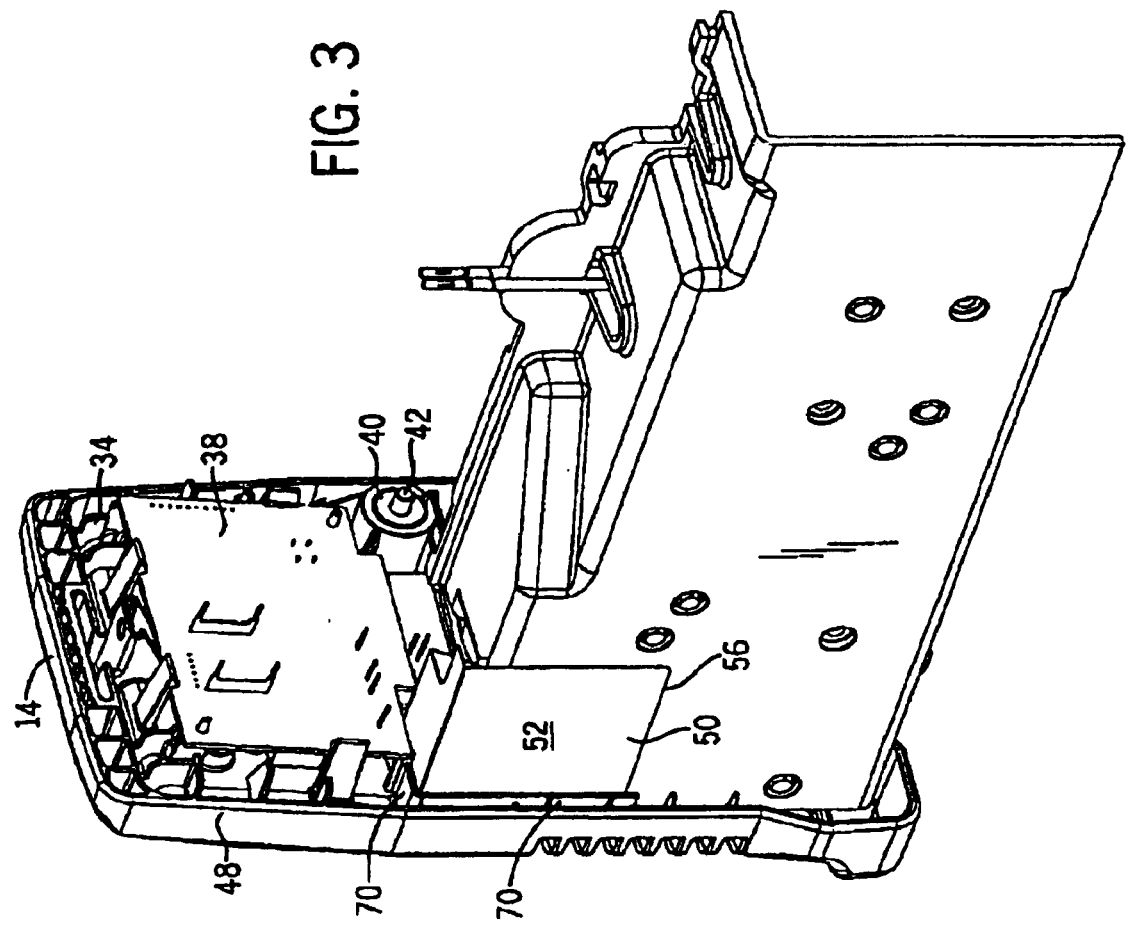
FIG. 3 is a perspective view, taken from the side of the welding apparatus, and showing the electrical shield of the present invention in its installed position.

Turning now to FIG. 3 there is shown a perspective view of the front panel 14 and showing the electrical shield 50 affixed thereto. There can also be seen in FIG. 3, further ribs 70 that affix the electrical shield 50 in position to the internal surface 34 of the front panel 14. Accordingly, as a step in the assembly of the welding apparatus 10, the electrical shield 50 can be simply Inserted into the proper position and held in that position by the plurality of ribs 70 to hold the electrical shield in that position. In some cases, some supplemental means may be used to make sure the electrical shield 50 is sufficiently held in Its desired position to the internal surface 34 of the front panel 14.

Figure 4:
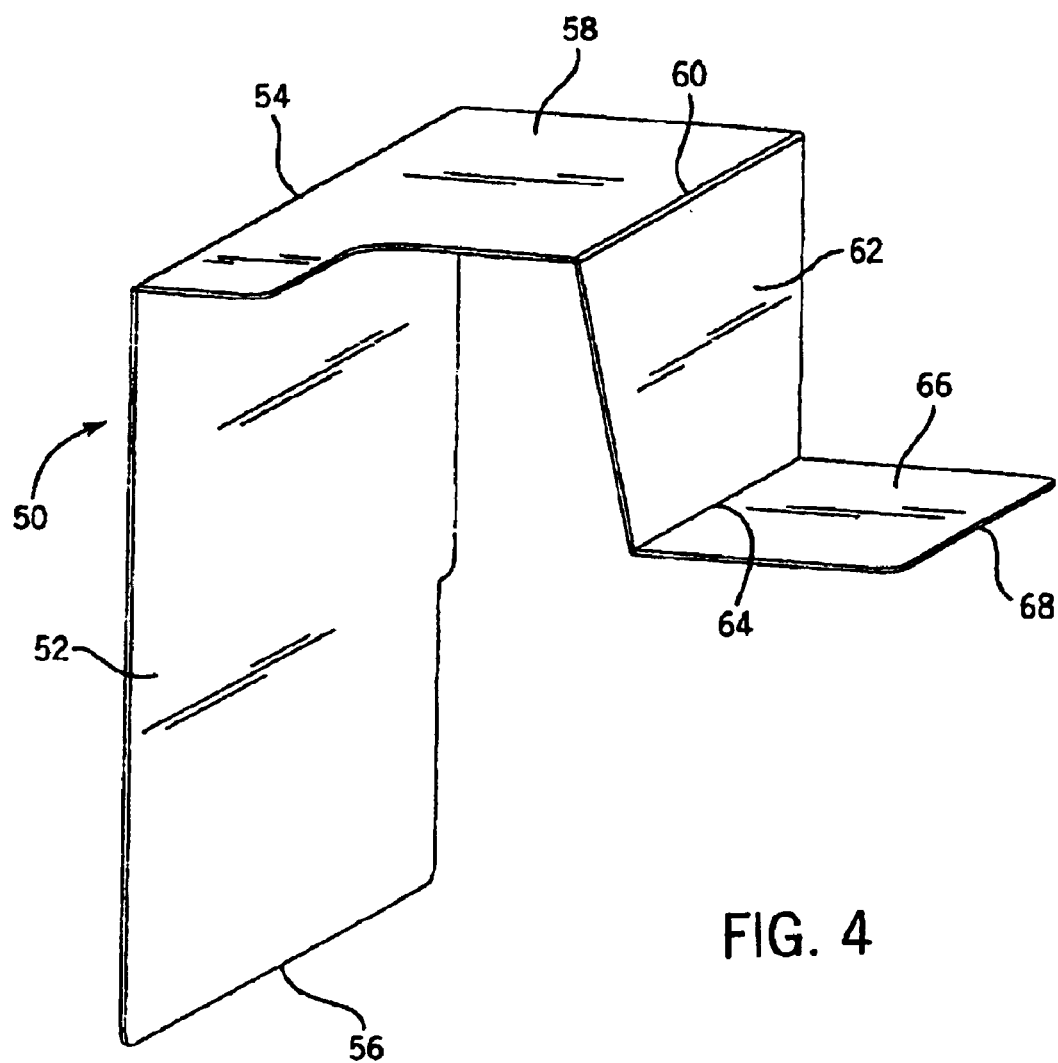
FIG. 4 is an enlarged perspective view of the electrical shield of the present Invention.

Turning finally to FIG. 4, taken along with FIGS. 1–3, there is shown a perspective view of the electrical shield 50 constructed in accordance with the present invention. As can be seen, the external planar side 52 is the longest side of the electrical shield 50 in view of its location intermediate the electrical stud 46 and the metal enclosure 12 when the welding apparatus 10 is assembled as in FIG. 1.

The upper planar side 58 is, in the preferred embodiment, in a plane that is generally at a right angle with respect to the plane of the external planar side 52 and extends inwardly from the upper external edge 54 of that external planar side 52. At the upper internal edge 60, the internal planar side 62 extends downwardly in a plane that is generally at a right angle with respect to the plane of the upper planar side 58.

At that point, as can be seen, there is a generally inverted U-shape that is formed by the external planar side 52, the upper planar side 58 and the internal planar side 62 so that, as seen in FIG. 2, the inverted U-shape at least partially surrounds the electrical stud 44. The space directly below the electrical stud 44 can be basically left with no shielding material since there are no conductive components in the near vicinity in the downward direction since only the plastic louvers 36 are in that area. Finally, the inward planar side 66 extends inwardly from the lower internal edge 64 of the internal planar side 62 to prevent arcs from passing around the lower internal edge 64 to reach the circuitboard 38.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

What is claimed is:

1. A portable welding apparatus comprising a metal enclosure and an end panel affixed to the metal enclosure forming an internal space for containing electrically conductive components, the end panel having an electrical terminal with an external receptacle for receiving an external cable and an internal electrical stud extending inwardly into the internal space, an electrical shield containing a majority of the internal stud therein to prevent arcing between said internal stud and an electrically conductive component or the metal enclosure.

2. The welding apparatus as defined in claim 1 wherein the electrical shield is comprised of a thin non-conductive material.

3. The welding apparatus as defined in claim 2 wherein the electrical shield is comprised of MYLAR plastic.

4. The welding apparatus as defined in claim 1 wherein the end panel is a molded plastic construction and the end panel has a plurality of molded ribs extending inwardly into the internal space and wherein the electrical shield is fitted into the molded ribs.

5. The welding apparatus as defined in claim 1 wherein the electrical shield has an external planar side having an upper edge and oriented in a vertical plane intermediate the internal electrical stud and the metal enclosure.

6. The welding apparatus as defined in claim 5 wherein the electrical shield has an upper planar side extending inwardly from the upper edge of the external planar side into the internal space to form an inner edge displaced inwardly of the internal stud and the upper planar side is oriented in a horizontal plane located above the internal electrical stud.

7. The welding apparatus as defined in claim 6 wherein the electrical shield has an internal planar side extending downwardly from the inner edge of the upper planar side and the inner planar side is oriented in a generally vertical plane and having a lower edge located below the internal electrical stud.

8. The welding apparatus as defined in claim 7 wherein the electrical shield has a lower planar side extending inwardly toward the internal space from the lower edge of the internal planar side and the lower planar side has an inner edge displaced a predetermined distance inwardly therefrom.

9. A method of providing electrical shielding to prevent arcing in a portable welding apparatus, said method comprising the steps of:

providing a portable welding apparatus comprising a conductive enclosure having an end panel, the end panel having an external surface and an internal surface to form an enclosed space with the conductive enclosure to contain conductive components, the end panel having an electrical terminal having a receptacle on the external surface and an electrical stud on the internal surface, the internal surface having a plurality of ribs extending outwardly therefrom, providing a pre-configured electrical shield, and affixing the electrical shield to the internal surface of the end panel to at least partially surround the electrical stud by fitting the electrical shield into the ribs to shield the electrical stud against arcing to the conductive components or the conductive enclosure.

10. The method of providing electrical shielding as defined in claim 9 wherein the step of providing a pre-configured electrical shield comprises providing a non-conductive electrical shield pre-configured in a generally U-shaped configuration.

11. The method of providing electrical shielding as defined in claim 9 wherein the step of providing a portable welding apparatus comprises providing a portable welding apparatus having a molded plastic end panel and the plurality of ribs extending outwardly from the internal surface are molded into the end panel.

12. A portable welding apparatus having an enclosure and at least one end panel joined to the enclosure to form an enclosed space for containing electrically conductive components, the end panel having an electrical stud affixed thereto and extending inwardly toward the enclosed space, a non-conductive shield comprising at least three planar sides, the non-conductive shield being affixed to the end panel to at least partially surrounding the electrical stud to prevent arcing between the electrical stud and an electrically conductive component.

13. The portable welding apparatus of claim 12 wherein the at least three planar sides form a generally U-shaped configuration.

14. The portable welding apparatus of claim 12 wherein the at least three planar sides are constructed of MYLAR plastic.

15. The portable welding apparatus of claim 12 wherein the end panel has a plurality of ribs extending outwardly proximate the electrical stud and the non-conductive shield is affixed to the end panel by being interfitted within the ribs.

16. The portable welding apparatus of claim 12 wherein one of the planar sides of the non-conductive shield is located intermediate the electrical stud and the enclosure.

17. The portable welding apparatus of claim 12 wherein the portable welding apparatus has a circuit board located within the enclosure and at least one of the planar sides of the non-conductive shield is located between the electrical stud and the circuit board.

* * * * *